W. J. GALT, Jr.
GARMENT HOOK.
APPLICATION FILED MAR. 20, 1915.
1,222,095.
Patented Apr. 10, 1917.
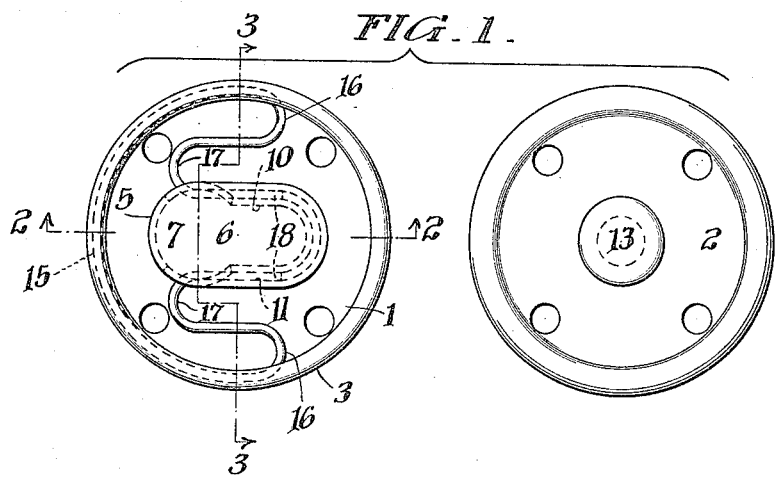
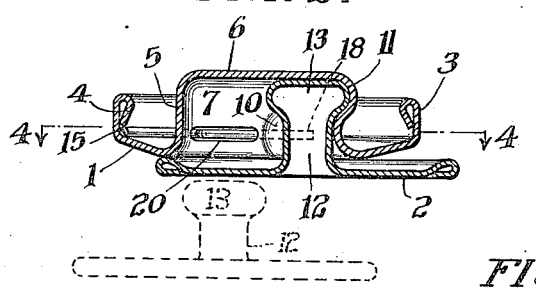
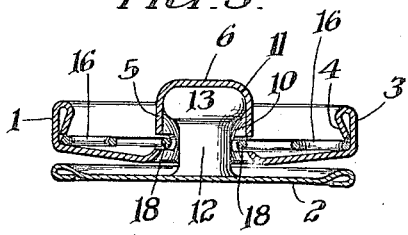
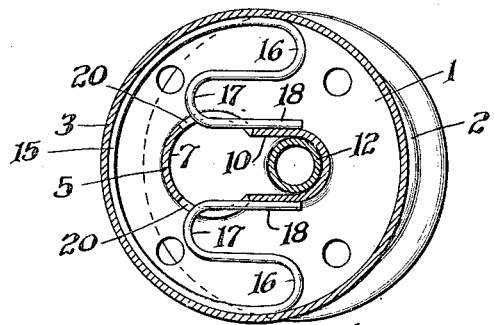
WITNESSES
Carrie E. Kleinfelder
Daniel Webster Jr.
INVENTOR
William J. Galt Jr.
BY
Cyrus N. Anderson
ATTORNEY

UNITED STATES PATENT OFFICE.

WILLIAM J. GALT, JR., OF PHILADELPHIA, PENNSYLVANIA, ASSIGNOR TO THE DE LONG HOOK AND EYE COMPANY, OF PHILADELPHIA, PENNSYLVANIA, A CORPORATION OF PENNSYLVANIA.

GARMENT-HOOK.

1,222,095.      Specification of Letters Patent.      Patented Apr. 10, 1917.

Application filed March 20, 1915. Serial No. 15,688.

*To all whom it may concern:*

Be it known that I, WILLIAM J. GALT, Jr., a citizen of the United States, residing in the city and county of Philadelphia, State of Pennsylvania, have invented certain new and useful Improvements in Garment-Hooks, of which the following is a specification.

One of the objects of my invention is to provide a garment fastener including an improved construction of socket member said socket member having a hollow closed projection for the reception of the ball of the ball member of the fastener and the closed projection of said socket member having a throat portion which is adapted to constitute a seat for the ball of the ball member when the said members are in assembled holding relation with respect to each other.

Other objects and advantages of my invention will be referred to in the detailed description thereof which follows or will be apparent from such description.

In the accompanying drawings I have illustrated a garment fastener embodying my invention but it should be understood that changes in the details of construction may be made within the scope of the claim without departing from the invention.

In the drawings:—

Figure 1 is a view showing the outer side of the socket member and the inner or ball side of the ball member;

Fig. 2 is a transverse sectional view of the ball and socket members in assembled relation, the said view being taken on a line corresponding to the line 2—2 of Fig. 1, said view also showing the ball member in position ready to be inserted into the socket of the socket member;

Fig. 3 is a view taken on a line corresponding to the line 3—3 of Fig. 1 and showing the ball and socket members in assembled relation with respect to each other, the ball of the ball member being situated in the throat portion of the socket of the socket member; and Fig. 4 is a horizontal sectional view taken on the line 4—4 of Fig. 2.

Referring to the drawings, 1 designates a socket member and 2 the ball member of a fastener. The socket member is provided at its outer edge with a turned up portion 3 the upper edge of which is reversely, inwardly and downwardly bent as indicated at 4. The portions 3 and 4 constitute the outer rim of the socket member of the fastener. The central portion of the socket member is provided with a hollow projection 5 which is closed, as indicated at 6. The portion 7 of the said projection is circular in transverse section and the walls thereof are substantially straight or vertical with respect to the general plane of the socket member of the fastener.

The throat portion of the socket comprises a relatively narrow portion 10 and a wider portion 11 which portions are joined to and extend away from the circular portion 7. The narrow portion 10 of the throat constitutes a seat for the narrow neck portion 12 of the ball member 2. When the narrow neck portion 12 of the ball is seated in the narrow portion 10 of the throat of the socket the head portion 13 thereof is seated in the semi-circular groove formed by the outwardly swelled and enlarged portion 11 of the throat of the socket member. The relation of the neck and head portions 12 and 13 of the ball to the throat portions 10 and 11 of the socket is very clearly shown in Fig. 2 of the drawings. The ball and socket members are shown in Figs. 2, 3 and 4 in the relative positions occupied thereby when they are in assembled holding position.

In order to permit the ready engagement and disengagement of the ball of the ball member with and from the socket member and at the same time prevent the accidental disconnection or disengagement of the members I provide a spring member having a body portion 15 in engagement with a portion of the inside of the part 3 of the rim immediately underneath the lower edge of the inwardly and downwardly bent portion 4 thereof. Being situated underneath the lower edge of the inwardly and downwardly bent portion 4 the spring is retained in position. The opposite end portions of the spring are bent inwardly as indicated at 16 and thence back toward the body portion 15 thereof. Said end portions are again bent, as indicated at 17, and the end portions 18 thereof are extended forwardly in parallel relation to each other. Portions of the parallel parts 18 project through slots 20 in the opposite sides of the circular portion 7 of the socket of the socket member, as is clearly shown in Figs. 2, 3 and 4 of the drawings. The end portions of the parallel parts 18 lie in grooves upon the outer opposite sides of the narrow portion 10 of the throat of the socket member underneath the outwardly swelled and enlarged portion 11.

In assembling the members the ball member is first placed in the general position indicated in dotted lines in Fig. 2 of the drawings, after which the ball is inserted into the circular portion 7 of the socket between the parallel portions 18 of the spring, such portions receding or moving outwardly to permit the head 13 of the ball to pass beyond into the bottom of the said circular portion. After having been thus inserted into the circular portion 7 of the socket the members are moved relatively to each other so as to carry the ball of the ball member into the position indicated in Figs. 2, 3 and 4 of the drawings with the neck 12 of the ball situated in the narrow portion 10 of the throat while the head thereof is seated in the enlarged circular seat formed by the portion 11 of the throat of the socket.

It will be seen that when the members of a fastener embodying my invention are assembled and in use there is no chance of separation when the members are subjected to strain in directions in the general plane of the two members and transversely of the axis of the ball of the ball member, it being understood that such strains are in a direction to draw the ball into the throat portion of the socket. Notwithstanding that the members are thus secure against separation due to pulls, stresses and strains they may be readily separated by moving them relatively to each other so as to return the ball into the circular portion 7 of the socket after which but slight force or effort is necessary to cause the ball to slide outwardly between the opposing portions 18 of the retaining spring.

The broad subject matter of invention disclosed herein and not claimed is claimed in my copending application filed March 17, 1915, Serial Number 14882.

I claim:—

A garment fastener comprising ball and socket members said socket member consisting of a single integral plate having a hollow closed projection formed therein said projection including enlarged and reduced portions, the enlarged portion being adapted to permit insertion of the head of the said ball member into the said hollow projection and the said reduced portion which is situated at one side of the said enlarged portion constituting a throat into which the neck portion of said ball may be moved after the said ball and neck portion have been inserted into the said hollow projection, and the enlarged part of said projection having oppositely disposed openings in the sides thereof and the said plate also having a circular flange-like portion at its outer edge, a bent spring having a portion which is seated against a portion of said flange and other portions which extend across said openings, the ends of said other portions of spring occupying positions on opposite sides of the reduced portion of said projection, substantially as described.

In testimony that I claim the foregoing as my invention I have hereunto signed my name this 17th day of March, A. D. 1915.

WILLIAM J. GALT, Jr.

In the presence of—
F. H. MACK,
J. A. SMITH.

Copies of this patent may be obtained for five cents each, by addressing the "Commissioner of Patents. Washington, D. C."